Patented Oct. 3, 1933

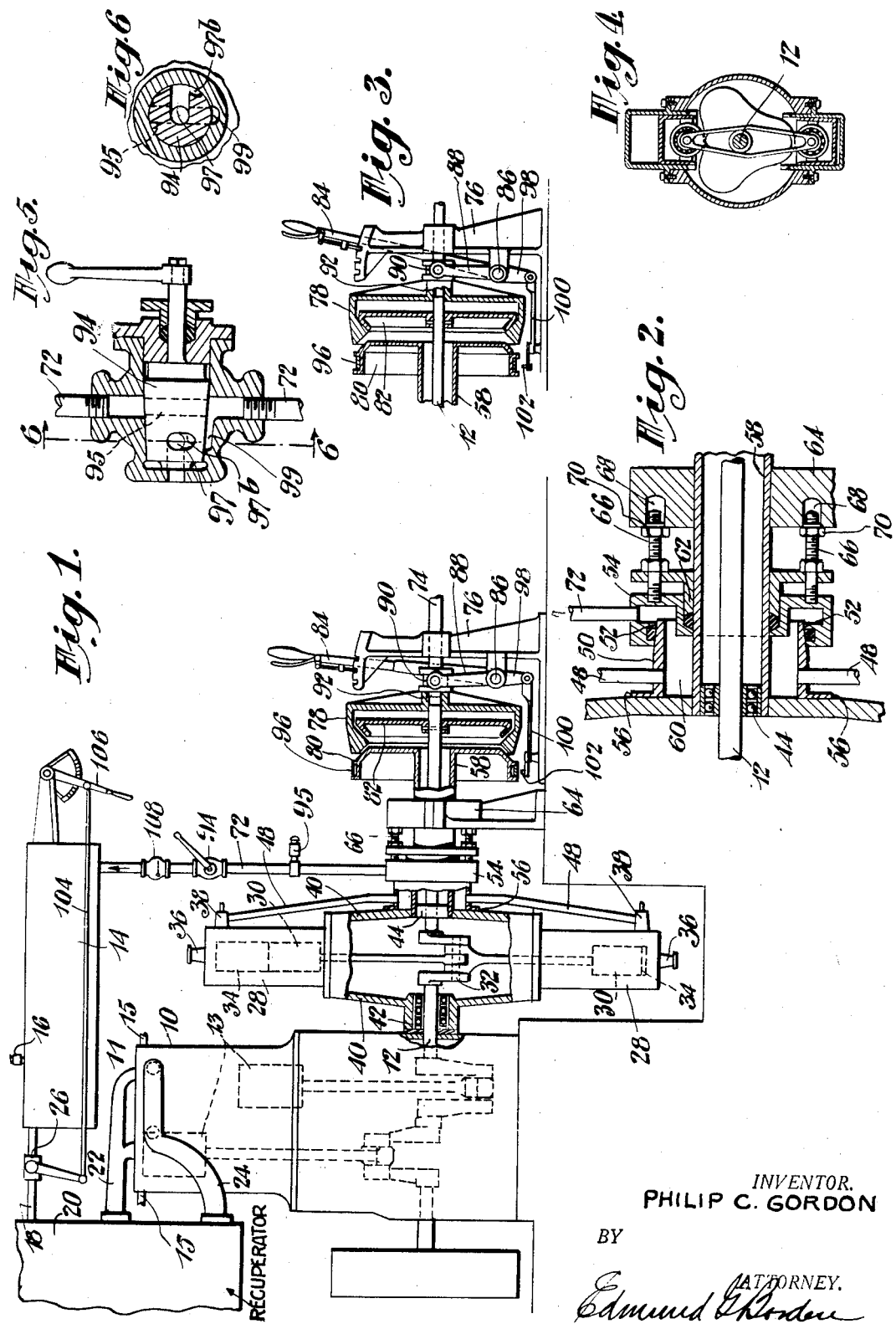

1,929,186

UNITED STATES PATENT OFFICE 1,929,186

ROTARY AIR TRANSMISSION

Philip C. Gordon, New York, N. Y., assignor to Doherty Research Company, New York, N. Y., a corporation of Delaware Application August 7, 1928. Serial No. 298,084

4 Claims. (Cl. 123—1)

The present invention relates to reducing transmissions in which the load may be rotated at a less speed than the motor or engine.

A number of different types of transmissions have been proposed or employed for transmitting torque or rotative movement from a motor or engine to a loaded driven shaft. If the load is heavy it is desirable to be able to rotate the motor much faster than the load in order to develop the full horsepower of the motor as far as possible and thereby to apply maximum torque to the load either to keep it running or to accelerate it. The use of reducing transmissions is especially common in automotive vehicles. The ordinary automobile employs a gear box having a gear ratio at lowest speed of perhaps 3.8, and a direct drive for the highest speed with means providing an intermediate gear ratio for the second speed. This arrangement has proved satisfactory for relatively light and expensive vehicles such as pleasure cars in which the maximum power of the engine is very high in comparison to the load to be accelerated. On heavy trucks or on omnibuses, and in similar situations where a very heavy load must be hauled at times for considerable distance or where a heavy vehicle must be accelerated rapidly, the gear shift type has not proved satisfactory. Under such conditions, the wear on the transmission has been destructive. For instance, it has been stated that the gears and clutch faces on the buses running on Fifth Avenue, New York city, must be replaced about once a month.

For coping with the severe conditions mentioned above, a number of different arrangements have been proposed. The so-called gas-electric drive has been used on a considerable number of buses. This arrangement comprises a dynamo driven by a combustion engine and one or more motors geared to the wheels with electric transmission between the dynamo and motor or motors. It has the advantage of permitting the engine to attain a certain speed while the motors are stationary thereby building up a considerable current and torque for starting and at low speeds, but the full power of the engine cannot be employed under such circumstances without introducing resistances into the electric circuits, thereby reducing the efficiency. Furthermore, the gas-electric arrangement is heavy and expensive and has not been developed to permit of a direct drive from engine to wheels.

Certain hydraulic transmissions have been proposed for use on heavy trucks and in like vehicles, but no material use has been made of them.

Certain transmissions have been proposed, also, utilizing compressed air as the medium for transmitting the torque from the engine shaft to the loaded shaft. In this case too, no material use has been made of the fluid transmission.

It is customary to employ four stroke cycle explosion engines in automotive vehicles and to compress the air for combustion in the combustion space. A type of combustion engine has been proposed for use in automobiles and for other purposes in which the air for combustion has been compressed externally of the combustion space. This type of engine, while it is not attractive for automotive purposes when the vehicle is fitted with a geared drive, possesses the advantage that it can be used as an explosion engine on the two stroke cycle, thereby offsetting the weight of the air compressor and, furthermore, it has been found that the air compressor can be utilized as a device through which the power of the engine can be transmitted with relatively small losses. The present invention is based on this discovery.

An apparatus embodying the present invention is illustrated in the accompanying drawing in which Fig. 1 is an elevational view of an apparatus in accordance with the present invention, parts being broken away and parts being shown in section for the purposes of illustration;

Fig. 2 is a detail view in section illustrating the arrangement for taking off compressed air from the rotating air cylinders illustrated in Fig. 1;

Fig. 3 is a detail section of the clutch mechanism appearing in Fig. 1 and illustrating the parts in position for direct drive; and Fig. 4 is a detail illustrating a cam which may be substituted for the crank in the air compressor of Fig. 1.

Fig. 5 is a detail view in vertical section of an auxiliary throttle valve appearing in Fig. 1.

Fig. 6 is a section on the line 6—6 of Fig. 5.

In the drawing 10 is an internal combustion engine preferably of the explosion type. As illustrated, the engine 10 has two combustion chambers and pistons therefor, the pistons being coupled to the shaft 12 by cranks and connecting rods or by other suitable means.

The air used for the combustion of fuel in the combustion chambers of the engine 10 is compressed externally of the engine and preferably is stored in a reservoir 14. A safety valve 16 is provided on the reservoir 14 to prevent damage to the reservoir in case of abnormal internal pressures. Air for combustion is taken from the reservoir by means of a pipe 18. Pipe 18 passes through a recuperator 20 before connecting with a manifold 22, from which the air is taken off through the tops of the cylinders of the engine 10 and into combustion chambers 11 within the cylinders. Combustion chambers 11 are enclosed partly by the cylinders or casing of the engine 10 and partly by the pistons 13, 13 mounted to reciprocate therein. Within the recuperator 20 the air is heated by products of combustion discharged from the engine 10 through the pipe 24. While the use of a recuperator is preferred, it is not essential to the present invention. A throttle valve for controlling the flow of air to the engine 10 is preferably used and such valve may be conveniently located at the point 26 in the pipe 18 intermediate the reservoir 14 and recuperator 20. The air for the reservoir 14 is compressed in an air compressor exterior to the combustion spaces of the engine 10. As illustrated, two compressing cylinders 28, 28 are employed, in which are mounted pistons 30, 30. The pistons are operated by a crank 32 connected to the engine shaft 12. It will be seen that if the cylinders 28 are stationary or revolve at a speed less than that of the shaft 12, the pistons 30 will be reciprocated by the crank 32 to compress air in the compression chambers 34, 34, formed between the cylinders 28 and pistons 30. The compression chambers 34 enclosed by the cylinders 28 and pistons 30 are connected with the atmosphere through suitable intake valves 36, 36. The cylinders 28 also are provided with suitable outlet valves 38, 38.

The reciprocation of pistons 30 relatively to the cylinders 28 therefore, draws in, compresses, and expells air in the manner common to air compressors. The air compressor of which the cylinders 28 form a part, however, is different from the ordinary type in that the cylinders are mounted to rotate. For this purpose, cylinders 28 are mounted on side disks 40, 40 journaled on the shaft 12 at the points 42 and 44 and are also journaled in the frame of engine 10 at the point 46. In consequence of the rotation of the cylinders 28, special means are provided to conduct the compressed air from the cylinders to the reservoir 14. For this purpose, pipes 48, 48 connect with the outlet valves 38 to conduct the compressed air readily to the interior of a hollow rotating hub 50. The outer end of hub 50 is tapered as illustrated at 52 in Fig. 2, and a hollow stationary member 54 is provided bearing on the tapered surface 52 and packed to prevent air leakage. At its inner edge, the drum 50 is welded to the outer face of the disk 40 along the line 56, to form an air tight joint. Within the hub or drum 50 is a hollow shaft member 58 which is fixed to the disk 40 and surrounds the shaft 12 where it extends from the crank 32 on the opposite side of the air compressor from the engine 10. The hollow shaft 58 will be seen to lie within the drum 50 and to form therewith an air chamber 60 into which the pipes 48 deliver. The inner edge of the hollow stationary member 54 bears on the outer surface of the hollow shaft or cylinder 58 and the surface between the members 54 and 58 is packed by gland 62 to prevent leakage of air. The hollow shaft 58 is journaled in a pedestal 64 and the member 54 is kept from rotating by bolts 66, 66. Bolts 66 are fixed to the member 54 and extend into sockets 68, 68 in the pedestal 64 to prevent the member 54 and the bolts 66 from rotating. The member 54 can be adjusted to bear against the tapered surface 52 to the desired degree by means of nuts 70, 70 on the bolts 66. Air which has been delivered into the chamber 60 by pipes 48 is withdrawn therefrom through the hollow member 54 by means of pipe 72 which connects with and delivers the air to the reservoir 14.

In the arrangement illustrated, the load to be driven or accelerated is assumed to be attached to the shaft 74. Shaft 74 is journaled in a pedestal 76, and one end of the shaft extends through the pedestal in the direction towards engine 10. The end of shaft 74 between the engine and the pedestal carries a clutch member 78 which is splined to the shaft 74 so as to rotate therewith, but to permit the clutch member to slide on the shaft. The hollow shaft 58 extends beyond the pedestal 64 from engine 10 to a point adjacent the clutch member 78, and the end of the shaft 58 intermediate the pedestals 64 and 76 carries the combined clutch member and brake drum 80. The shaft 12 extends away from the engine 10 through the hollow shaft 58 to a point between the pedestals 64 and 76 lying intermediate the member 80 and the shaft 74. The end of the shaft 12 at the point mentioned, carries a clutch disk 82 which lies within the clutch member 78. The clutch members 80 and 82 have inclined surfaces near their outer edges which flare outwardly away from each other, and the clutch member 78 has a bearing portion shaped to fit into the V-shaped groove between the outer edges of the members 80 and 82. Members 80 and 82 are so spaced, and the member 78 is so proportioned, that the member 78 can be placed in a neutral position in which it does not engage either of the clutch members 80 or 82. By throwing the member 78 one way or the other, it may be engaged with either member 80 or clutch 82 as desired. For this a hand lever 84 is provided; lever 84 being fixed to a pin 86 journaled on the pedestal 76, and fixed also to a rock arm 88 which engages the clutch member 78 by means of a pin and groove connection 90 with a sleeve 92 fixed to the clutch member 78.

When it is desired that the loaded shaft 74 run at low speed relative to the engine shaft 12, the member 78 is shifted to the left as viewed in Fig. 1, thereby coupling shaft 74 to the disk 80, and through the hollow shaft 58 to the compressor cylinders 28. Under these conditions, the pistons 30 will move rapidly with respect to the cylinders 28 and compress a large amount of air in the chambers 34. The compression of air in the chambers 34 produces a torque on the hollow shaft 58, thereby driving the load through the disk 80 and the clutch member 78. The greater the resistance of the load and the slower the speed of the shaft 74 and shaft 58, the more rapidly the pistons 30 move with respect to the cylinders 28, and the greater the amount of air compressed per unit of time and delivered to the reservoir 16. However, as the air is burned in the combustion chambers of the cylinders 10, and thereby heated to a high degree compared to the air in the compression chambers 34, it is not necessary to use so much air in the combustion chambers 11 in order to maintain a given mean effective pressure as is delivered by the air compressor. Therefore the air pressure in the reservoir 14 tends to build up. The excess of air delivered by the air compressor over that required by the engine is amplified by the use of a recuperator as indicated at 20. The air taken from the reservoir and delivered to the engine being heated in the recuperator, inceases the efficiency of the engine to a maked degree, and thereby cuts down the amount of air required to operate it. As the air compressor delivers against the reservoir pressure, an increase in pressure in the reservoir increases the torque required to drive the air compressor, and thereby increases the torque on the load. It will be seen, therefore, that once the load begins to turn, the torque delivered to it by the apparatus in accordance with the present invention, can be increased almost indefinitely within the limits of strength of the piping and reservoir for the compressed air. If, however, the air pressure is low at the time it is desired to start a load, the torque required to turn the air compressor may not be sufficient to start the load. In this case, if the disk 80 is clutched to the member 78, the compressor cylinders 28 will remain stationary, and a maximum amount of air will be delivered by the air compressor to build up the pressure in the reservoir 14. In this way the pressure can be built up to that necessary to start a very large load. However, if it is desired to start the load immediately, this can be done by throttling the outlet of the air compressor. For this purpose a throttle valve 94 is provided in the pipe 72 which can be closed for a short time to produce a temporary high resistance to the delivery of air from the air compressor, thereby giving the load a sudden jerk to start it. It is often the case that once the load has been started, it can be kept in motion by a much lower torque. If this is the case, the throttle 94 can be thrown fully open as soon as the load begins to move. Otherwise, if it is important it is permissible to stop and build up the air pressure in reservoir 14 to a point such that the torque requied to operate the air compressor is sufficient to maintain the load in motion. Of course, throttling the air from the compressor by valve 94 involves a loss of energy. Preferably, a poppet valve 95 is placed in the pipe between the air compressor and valve 94 to relieve the air pressure if it should rise too high when valve 94 is used. It will be understood also that, if the compressor is fitted with unloading means, it is preferred that the apparatus include operator controlled means whereby the unloading mechanism is prevented from acting except when the apparatus is in the position of direct drive.

Under certain conditions, it is desired to start a vehicle or train of vehicles gradually. Under such circumstances, a light torque should be applied to the vehicle or vehicles at first. In order that the operator may apply to the vehicle or cause the apparatus to deliver a light torque when desired, the valve 94 may be constructed as a two-way valve, and more particularly as illustrated in Figs. 5 and 6. As illustrated in Figs. 5 and 6, valve 94 has a cylindrical body or plug within which is a tubular passage 95. Passage 95 is arranged radially with respect to the body of valve 94 and is so placed that as the valve body is turned, passage 95 moves in a vertical plane containing the pipe 72. When the valve 94 therefore is in the position in which passage 95 is vertical, the air from the air pump 28 is delivered through pipe 72 to the reservoir 14 without hindrance. In case it is desired to throttle the air passing to the reservoir to offer greater resistance to the revolution of the cylinders of the air pump, the cylindrical turning plug of valve 94 is turned clockwise from the position illustrated in Fig. 5 and when viewed from the right of Fig. 5. If on the other hand, it is desired to reduce the resistance to the turning of the air compressor cylinders and thereby reduce the torque delivered by the apparatus, this may be done by turning the plug of valve 94 counter-clockwise from the position illustrated in Fig. 5 and when viewed from the right of Fig. 5. The plug of valve 94 is provided with a passageway 97, one portion of which is axial and the other radial with respect to the plug. The radial portion of the passage 97 may connect when the valve is turned to the position 90° from that of Fig. 6 with a groove 99 in the casing of the valve 94, groove 99 being connected with the portion of the pipe 72 running from the air compressor. The axial portion of the passage 97 discharges to the atmosphere. By this arrangement, it will be seen that pressure on the air delivered from the air pump can be varied as desired from atmospheric up to that of the reservoir 14 or higher, depending upon the setting of the plug of valve 94. The delivery of air to the atmosphere can be made to overlap the delivery of air to the reservoir, if desired, by means of a circumferential groove 97B in the face of the plug of valve 94 connecting with the radial portion of the passage 97.

On the other hand, if the torque required to drive the rotating structure of the compressor, including the cylinders 28, is sufficient to accelerate the load, it is often desired to couple the loaded shaft 74 direct to the engine shaft 12. This condition is analogous to that of the direct drive in the ordinary automobile transmission. For this purpose, a brake band 96 is provided which is operated from the lower arm 98 of the rock lever 88 previously mentioned. The arm 98 is pivoted to a rod 100 adapted to actuate the brake band 96. The arrangement is such that when the clutch member 78 is released from the disk 80 by the hand lever 84 and rock lever 88—98, the rod 100 applies the brake band 96 to the disk 80 to hold the disk stationary. For this purpose, a link mechanism 102 connects the rod 100 to the ends of the brake band 96. The disk 80 being stationary, the cylinders 28 also are then held stationary, and the air compressor will deliver air at a maximum rate. The clutch member 78 having been released from the disk 80 can now be thrown into contact with the disk 82 on the engine shaft 12, thereby directly connecting the engine with the loaded shaft 74. The engine will then drive the load as in the ordinary direct drive of the pleasure automobile, and the speed can be regulated very conveniently within wide limits by concurrently varying the position of the air throttle valve 26, and the oil injector valves 15, the operation under these conditions being analogous to the operation of a steam driven automotive vehicle. The relative positions of the parts for the direct drive are illustrated in Fig. 3. In the arrangement illustrated in Fig. 1, rod 104 is pivoted to the lever of the throttle valve 26 and connected to a hand lever 106, in order that the throttle 26, hand lever 84, the oil injector valves 15, and throttle 94 may all be controlled conveniently from one operator's position.

Under certain conditions, air pressure in reservoir 14 may tend to become inconveniently high. In order to limit the air pressure in the reservoir, a pop valve 16 or other form of safety valve may be used, or one of the well known mechanism (not shown) may be used for reducing the amount of air delivered by the air compressor when the pressure in the reservoir has reached a desired limit. Such mechanisms are often referred to as unloading mechanisms.

The cam illustrated in Fig. 4 is a known mechanism which may be substituted for the crank illustrated in Fig. 1, as driving the pistons of the air compressor. This cam mechanism forms no part of the present invention however, although the use of some form of cam in place of an ordinary crank promises to be advantageous in the apparatus in accordance with the present invention.

While the throttle valve 26 has been illustrated as placed between the reservoir and the recuperator instead of between the recuperator and the engine, the present invention is not limited to placing the throttle valve between the reservoir and the recuperator, nor indeed in any particular position. Furthermore, the present invention is not limited to the use of a recuperator.

It will be noted that the cylinders of the air compressor will revolve for the greater part of such period of time as the engine is running under full load. The air compressor therefore is preferably of the air-cooled type although not limited to this. It will be noted also that valves 15 are indicated and illustrated as part of means for supplying fuel to the engine 10. Such means however are essential parts of combustion engines and are well known. The means for supplying fuel to the engine 10 therefore has not been illustrated or described more in detail.

While no speed governor or valves are shown in connection with engine 10, the use of governors and valves in combustion engines is common practice and consequently are not illustrated or described in detail herein, although in general, engines used in apparatus embodying the present invention will be provided with governors and valves.

It will be seen that an apparatus according to the present invention is well adapted to dynamic braking. If either the fuel supply or air supply or both are cut off from the engine and the loaded shaft 74 continues to revolve, the parts being in the position of direct drive as in Fig. 3, the air compressor will continue to operate to force air into the reservoir 14, thereby utilizing the energy of the load to store air for future use. In cases where the present invention is applied to vehicles needing to start and stop frequently, this feature of dynamic braking is very important.

It will be understood from the foregoing that if the engine shaft 12 is revolving at full speed and loaded shaft 74 turning slowly, the parts being in the position illustrated in Fig. 1, the torque applied to the loaded shaft 74 may be very high, the present apparatus acting in a manner analogous to a slipping clutch, but without the friction and consequent rapid wear produced by slipping a clutch. It will be seen, however, that as the engine is built to run at full power and maximum speed while the loaded shaft revolves at a minimum speed, the torque which may be applied to the loaded shaft is limited solely by the strength and weight which it is considered desirable to embody in the shafts of the apparatus. In case of vehicles, the desirable torque is, of course, limited to that required to slip the wheels. In use, the present apparatus is remarkable in respect to its capacity to maintain a high torque throughout a wide range of speeds, thereby permitting very rapid acceleration.

It will be noted that the operation in accordance with applicant's invention is in marked contrast to that of a gas electric drive wherein the engine can run at top speed only if the field of the generator is reduced or if resistances are used in the leads running to the motor. Similarly, if the engine of a hydraulic drive is run at full speed and power, there is a large loss of energy which cannot be translated into torque due to the hydraulic slippage and consequent friction. Also if the ordinary type of air transmission employing an engine, a separate compressor and a separate motor is employed, the motor must be made of unwieldy size in order that it can employ at low speed the entire output of a high speed engine and compressor.

It will be understood that the arrangement illustrated is given by way of example only and that the invention is not limited thereto. In particular, I do not limit myself to an air compressor of the reciprocating piston type, or to an engine of the reciprocating piston type. Neither do I limit myself to a particular stuffing box structure such as that including the chamber 60, or a particular clutch mechanism or to including both the choking function and the air discharge function in one valve such as 94, since various forms of each of these elements is in common use.

Having thus described my invention, I claim:

1. A power developing and transmitting apparatus including an engine having a combustion chamber and a movable element developing power from the products of combustion, an air compressor having a compression chamber separate from said combustion chamber and having two relatively movable elements forming the walls of said chamber, an air reservoir, means including said reservoir for delivering compressed air for combustion from said compression chamber to said combustion chamber, means to connect one of the movable elements of said air compressor to a load to retard it with respect to the other movable element of the compressor, and means to deliver power to the other movable element of the compressor from the element of the engine developing power from the combustion gases.

2. A variable speed transmission comprising in combination an engine, an air compressor having two members mounted for rotation one of which is connected to be driven by said engine, and means to connect the other of said members to a load, connections including a reservoir for supplying air from said air compressor to said engine, means in said connections intermediate said reservoir and said engine to discharge air to the atmosphere, and means in said connections intermediate said reservoir and said compressor to control the passage of air away from the compressor.

3. A power developing and transmitting apparatus including an engine having a combustion chamber and a movable element developing power from the products of combustion, an air compressor having a compression chamber separate from said combustion chamber and having two relatively movable elements forming the walls of said chamber, means for delivering compressed air for combustion from said compression chamber to said combustion chamber, means to connect one of the movable elements of said air compressor to a load to retard it with respect to the other movable element of the compressor, means to deliver power to the other movable element of the compressor from the element of the engine developing power from the combustion gases, means for releasing the load from the member of the air compressor to which it was first connected, and connecting it to the other member of the air compressor for direct drive from the engine, and means for braking the member of the air compressor to which the load was first connected.

4. A power developing and transmitting apparatus including an engine having a combustion chamber and a movable element developing power from the products of combustion, an air compressor having a compression chamber separate from said combustion chamber and having two relatively movable elements forming the walls of said chamber, means for delivering compressed air for combustion from said compression chamber to said combustion chamber, means to connect one of the movable elements of said air compressor to a load to retard it with respect to the other movable element of the compressor, means to deliver power to the other movable element of the compressor from the element of the engine developing power from the combustion gases, means for releasing the load from the member of the air compressor to which it was first connected, and connecting it for direct drive from the engine, and means for braking the member of the air compressor to which the load was first connected.

PHILIP C. GORDON.